(12) United States Patent
Lee

(10) Patent No.: US 8,863,696 B1
(45) Date of Patent: Oct. 21, 2014

(54) PET SHELTER INCORPORATING FOOD AND WATER DISPENSERS

(76) Inventor: Douglas K. Lee, Dallas, GA (US)

( * ) Notice: Subject to any disclaimer, the term of this patent is extended or adjusted under 35 U.S.C. 154(b) by 410 days.

(21) Appl. No.: 13/175,686

(22) Filed: Jul. 1, 2011

(51) Int. Cl.
A01K 1/03 (2006.01)

(52) U.S. Cl.
USPC .......................................................... 119/482

(58) Field of Classification Search
CPC .... A01K 1/033; A01K 5/0114; A01K 5/0291
USPC ............ 119/51.5, 53, 55, 57.1, 482, 499–500
See application file for complete search history.

(56) References Cited

U.S. PATENT DOCUMENTS

| 920,975 | A | 5/1909 | Minion |
| 2,445,055 | A | 7/1948 | Capaul |
| 3,026,844 | A | 3/1962 | Spindler |
| 4,161,924 | A | 7/1979 | Walker |
| 4,334,501 | A | 6/1982 | McDaniel et al. |
| 5,115,762 | A | 5/1992 | Long |
| 5,433,171 | A * | 7/1995 | Ewell ............................ 119/51.5 |
| 5,551,371 | A | 9/1996 | Markey et al. |
| 5,964,190 | A | 10/1999 | Willinger et al. |
| 6,318,294 | B1 | 11/2001 | Richmond et al. |
| 2006/0054102 | A1 * | 3/2006 | Hailey ............................ 119/482 |
| 2006/0130769 | A1 * | 6/2006 | Nichols ............................ 119/58 |

FOREIGN PATENT DOCUMENTS

| EP | 1882411 | 1/2008 |
| WO | WO2004/068939 | 8/2004 |

* cited by examiner

*Primary Examiner* — David Parsley
*Assistant Examiner* — Timothy Schwarz
(74) *Attorney, Agent, or Firm* — Michael I. Kroll

(57) ABSTRACT

A pet shelter incorporating food and water stations with a roof hingedly attached to the main housing and secured in a closed position on one side of the housing by latches. When said latches are disconnected, the roof can be swung open for easy access to the interior. An optional heating element may be employed to prevent the water from freezing during cold weather.

11 Claims, 8 Drawing Sheets

PET SHELTER INCORPORATING FOOD AND WATER DISPENSERS

BACKGROUND OF THE INVENTION

1. Field of the Invention

Figure 1:
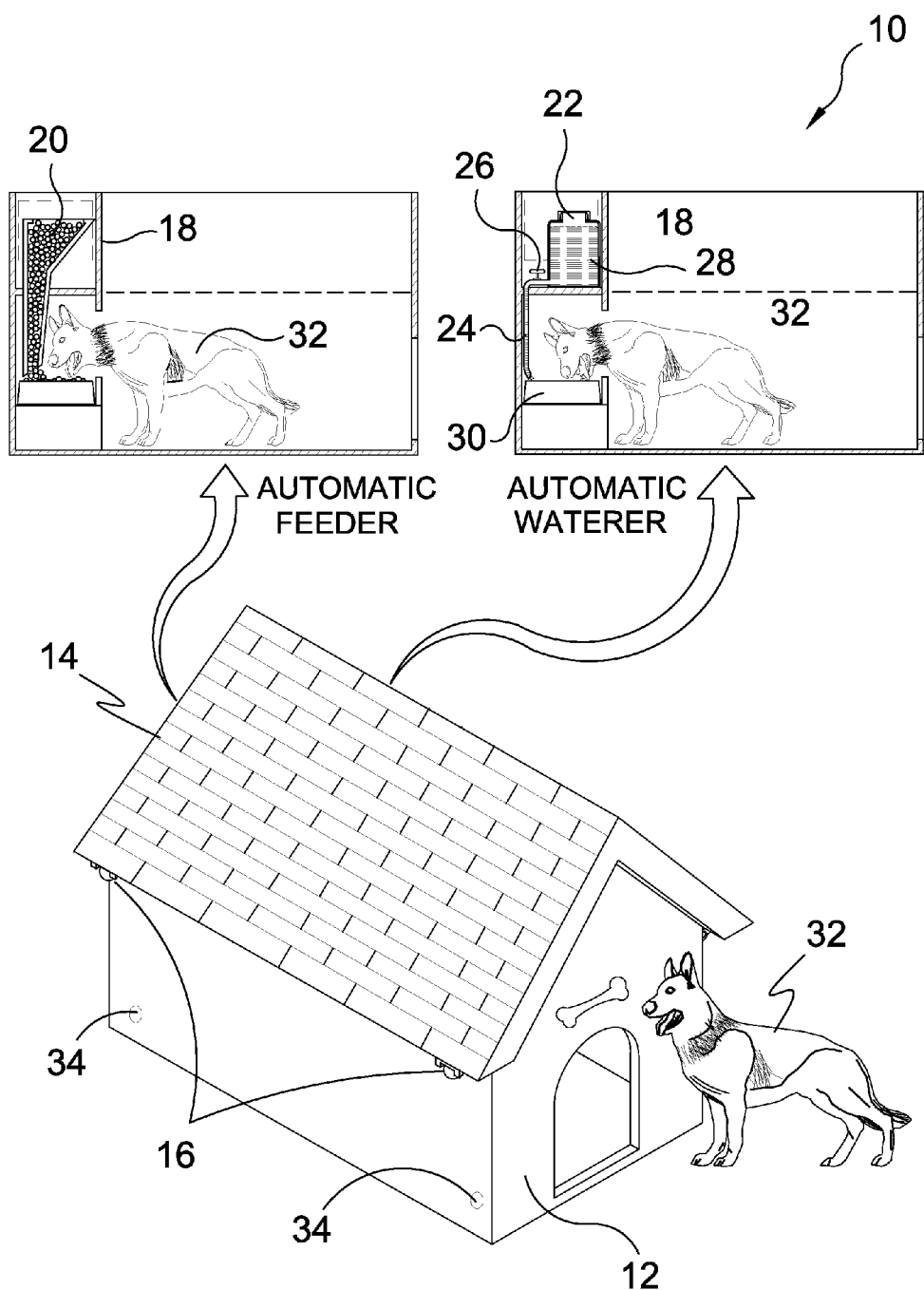

The present invention relates generally to enclosures and, more specifically, to a pet shelter incorporating food and water stations that are preferably 10 inches from the floor and 12 inches deep with a roof hingedly attached to the main housing and secured in a closed position on one side of the housing by latches. When said latches are disconnected, the roof can be swung open for easy access to the interior.

Within the back interior wall of the pet shelter are two side by side compartments. One side provides an automatic food dispenser that fills as the pet eats and the other side has an automatic water dispenser. Both compartments are accessed through an opening on the water compartment side. The water dispenser has tubing with an on/off valve that runs from the water storage container down into the water dish. The valve is shut off when the water container is refilled. The remaining portion of the interior structure is housing for the pet.

Further provided is a plurality of apertures positioned approximate the base corners so that anchors can be used to secure the pet shelter to the ground.

Optionally provided for is a heat strip and a power source to prevent the water from freezing.

2. Description of the Prior Art

There are other structural devices designed for pets. Typical of these is U.S. Pat. No. 920,975 issued to Minion on May 11, 1909.

Another patent was issued to Capaul on Jul. 13, 1948 as U.S. Pat. No. 2,445,055. Yet another U.S. Pat. No. 3,026,844 was issued to Spindler on Mar. 27, 1962 and still yet another was issued on Jul. 24, 1979 to Welker as U.S. Pat. No. 4,161,924.

Another patent was issued to McDaniel et al. on Jun. 15, 1982 as U.S. Pat. No. 4,334,501. Yet another U.S. Pat. No. 5,099,794 was issued to Pearce, Jr. on Mar. 31, 1992. Another was issued to Long on May 26, 1992 as U.S. Pat. No. 5,115,762 and still yet another was issued on Sep. 3, 1996 to Markey et al. as U.S. Pat. No. 5,551,371.

Another patent was issued to Willinger et al. on Oct. 12, 1999 as U.S. Pat. No. 5,964,190. Yet another U.S. Pat. No. 6,318,294 was issued to Richmond et al. on Nov. 20, 2001. Another was issued to Park on Aug. 19, 2004 as International Patent Application Publication No. WO2004/068939 and still yet another was issued on Jan. 30, 2008 to Chu as European Patent Application No. EP1882411.

U.S. Pat. No. 920,975

Inventor: John S. Minion

Issued: May 11, 1909

A kennel comprising a bottom portion having vertical sides, a top portion with vertical sides resting on the sides of the bottom portion, hinges connecting the sides of the bottom and top portions on one end, an arm swinging from its top end on the hinged end of the top portion, and a link pivoted to the bottom portion and to the arm near its hinged end, the link having slots near its ends for its pivotal installation.

U.S. Pat. No. 2,445,055

Inventor: Joseph A. Capaul

Issued: Jul. 13, 1948

In a knocked-down kennel having a rectangular floor, end panels hinged thereto, said panels being rabbeted along the side edges, and side panels rabbeted along the inner face of their lower edges, the floor fitting in the rabbet of the side panels, angular strips having two legs meeting at a right angle at each corner and overlapping the adjacent panels and defining together with the rabbets in the end panels channels receiving the side panels, and a hook and eye connection at the corner between the end panel and side panel.

U.S. Pat. No. 3,026,844

Inventor: Bernard A. Spindler

Issued: Mar. 27, 1962

A dog house comprising a semi-elliptical housing having a broad base and a relatively narrow truncated top, a top plate closing said top, a bottom plate covering said base, a dog door in said housing adjacent, and means adjacent the base of said housing comprising spaces eyelets on said housing adjacent its base and cooperating hooked anchor stakes for releasably holding said housing secured to the ground.

U.S. Pat. No. 4,161,924

Inventor: Scott D. Walker

Issued: Jul. 24, 1979

A molded reinforced plastic dome-shaped shelter for animals, having a door, a base having a floor spaced from the ground, a feeding stall in an outside alcove in the shelter housing, a track surrounding the shelter adjacent its base, a glide freely movable around said track for attachment of a tether for the animal, and spike means for anchoring the housing and base together and to the ground. The housing and base may be of one piece of plastic and then separated, or may be made into sectors and assembled by bolts or other fastening means. The door may be locked so the shelter may be used as a shipping container and lifted by the track around the base as its handle. The feeding stall or alcove is preferably provided with two dishes, one for water and the other for dry food, and their supply may be maintained automatically by containers mounted above these dishes in the alcove. The track and its glide may take many forms with the glide either sliding or rolling inside a C-shaped cross-section track or around the outside of the track. The tether attached to the glide may be provided with a resilient means to reduce shocking jerks on the glide and track.

U.S. Pat. No. 4,334,501

Inventor: Diana G. McDaniel et al

Issued: Jun. 15, 1982

An improved animal shelter having a feed dispenser is provided wherein the feed dispenser is disposable on one of the side walls, and preferably forms one of the sidewalls of the improved animal shelter. The feed dispenser includes a body member having a cavity formed wherein, the cavity extending from an upper end of the body member to the lower end of the body member. A feed trough is disposed adjacent the lower end of the body member so as to be in open communication with the cavity formed in the body member. Thus, animal feed can be disposed in the cavity of the body portion and stored therein for delivery to the feed trough.

U.S. Pat. No. 5,099,794

Inventor: Clarence W. Pearce et al

Issued: Mar. 13, 1992

A one or two story housing unit for a cat includes an enclosure having a roof portion, three solid walls and one port wall containing an opening through which a cat can enter the enclosure. Extending from the port wall is an open top porch area substantially surrounded by a vertical wall over which the cat can step and lie down in the porch or enter the enclosure. In the one story embodiment, the port wall opening is spaced from the bottom of the port wall and that portion of the port wall below the opening forms a portion of the porch enclosure. In the two story embodiment, a horizontal panel is positioned in the enclosure and the port wall extends from the horizontal panel upward to the roof.

U.S. Pat. No. 5,115,762

Inventor: Ruth I. Long

Issued: May 26, 1992

A durable, sturdy, prefabricated gable roof animal structure, such as a dog house, includes seven separate prefabricated sections which can be quickly assembled and dismantled. The assembled structure is rigidly secured internally in place by slip pin fastener hinge mechanisms attached at beveled edged adjacent sections and attached in combination with hasp fastener mechanisms at adjacent side wall and roof sections. The separated dismantled sections can be compactly stacked one on top of another for shipping or storage.

U.S. Pat. No. 5,551,371

Inventor: Dennis P. Markey et al

Issued: Sep. 3, 1996

A pet enclosure has a generally hollow box shaped base and a roof which is hingedly attached to the base. The hinged roof allows simplified access to the interior of the pet enclosure for cleaning, whelping or the like. The roof of the pet enclosure includes a chimney within which is located a passive vent which can be opened or closed to allow air flow through the pet enclosure to be controlled. A further embodiment of the pet enclosure includes an optional plastic curtain door and/or a solar powered vent fan which replaces the passive vent.

U.S. Pat. No. 5,964,190

Inventor: Jonathan Willinger et al

Issued: Oct. 12, 1999

A compact shelter includes a base and a plurality of interchangeable roofs mountable to the base. A flat roof may be provided with a railing and a series of steps leading to ground level to provide a pet with easy access to a raised resting area. A sliding front door and sliding internal partitions may be used to subdivide the shelter into a plurality of internal compartments. An improved cross ventilation system is provided along with a no-tangle leash assembly. Sloped floors leading to a drainage aperture facilitate cleaning and flushing of the shelter.

U.S. Pat. No. 6,318,294

Inventor: Edward A. Richmond

Issued: Nov. 20, 2001

A plurality of panels preferably made from a heat insulating material define an enclosure for a pet shelter. One of the panels has an opening for the pet to enter or exit the enclosure. The panels are disposed on a base member. Detents (e.g. hooks) on the panels are removably disposed in detents (e.g. openings) in the base member to position the panels in a particular relationship on the base member. The panels may be integral with one another or may be separate. When separate, the panels may be tilted inwardly to dispose the ends of adjacent pairs of the panels in a contiguous relationship. After being tilted, the panels are joined by locking rails, each engaging the contiguous ends of a different pair of adjacent panels and each removable to disengage the panels. A top cap on the panels defines a roof for the enclosure. When the panels are integral with each other, the top cap may be integral with the panels. When the panels are separate, detents on the top cap are removably coupled to detents on the panels, with the panels tilted, to position the top cap on the panels, thereby providing for easy assembly on, or disassembly from, the panels. The top cap has an opening to receive a vent cap. Whether the flaps are integral or separate, the vent cap is slidable in the opening in the top cap to adjust the size of a passage through which air circulates into and out of the enclosure.

International Patent Application Publication No. WO2004/068939

Inventor: Jin Soo Park

Published: Aug. 19, 2004

The present provides a pet doghouse. The pet doghouse has merits in that various bacteria being parasitic on pet dogs are sterilized y adopting an ozone generating unit and hypocaust unit, indoor space is maintained to the comfortable state by removing peculiar odor of the pet dogs, and the pet doghouse can be usefully used to a newborn little dog or a mother dog requiring afterbirth care by providing heat insulating environment.

European Patent Application Number EP1882411

Inventor: Guo Feng Chu

Published: Jan. 30, 2008

A pet shelter divided into a plurality of compartments of different interior temperatures with a temperature control device for controlling the temperature in the pet shelter, such that the interior temperatures change progressively across the compartments to blend into the temperature of the outside environment.

While these pet houses may be suitable for the purposes for which they were designed, they would not be as suitable for the purposes of the present invention, as hereinafter described.

SUMMARY OF THE PRESENT INVENTION

A primary object of the present invention is to provide a pet shelter incorporating a food dispenser and a water dispenser.

Another object of the present invention is to provide a pet shelter wherein said food dispenser and said water dispenser dispense their product over a period of time.

Yet another object of the present invention is to provide a pet shelter wherein said food dispenser and said water dispenser are preferably 10 inches from ground level.

Still yet another object of the present invention is to provide a pet shelter wherein said food dispenser and said water dispenser are preferably 12 inches deep.

An additional object of the present invention is to provide a pet shelter having a hinged roof providing access to said food dispenser and said water dispenser.

A further object of the present invention is to provide a pet shelter wherein said water dispenser has a removable reservoir.

A yet further object of the present invention is to provide pet shelter wherein said water dispenser has a shut off valve.

A still yet further object of the present invention is to provide a pet shelter having a plurality of apertures for placement therethrough of anchors.

Another object of the present invention is to provide a heating element to prevent the water from freezing during winter months.

Additional objects of the present invention will appear as the description proceeds.

The present invention overcomes the shortcomings of the prior art by providing a pet shelter incorporating food and water stations with a roof hingedly attached to the main housing and secured in a closed position on one side of the housing by latches. When said latches are disconnected, the roof can be swung open for easy access to the interior.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
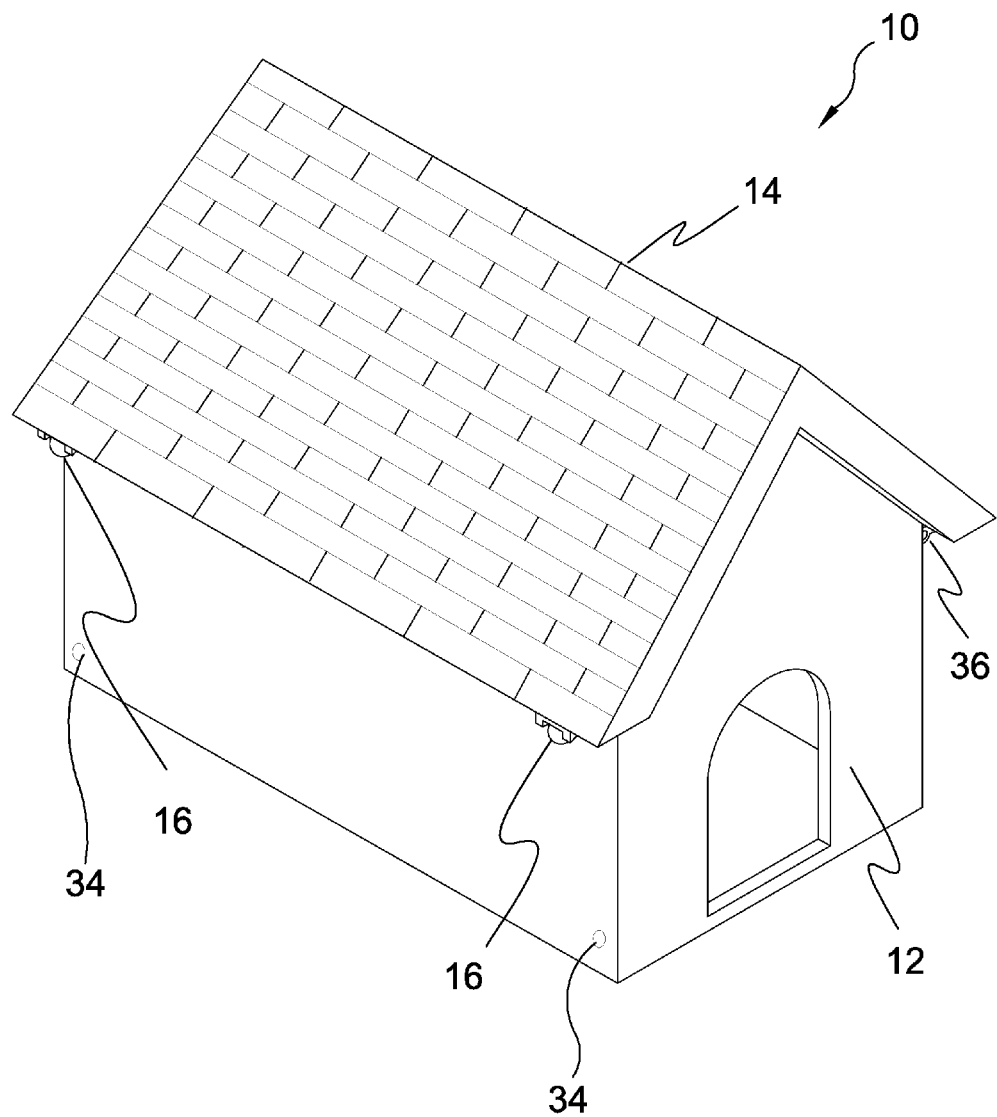
Figure 3:
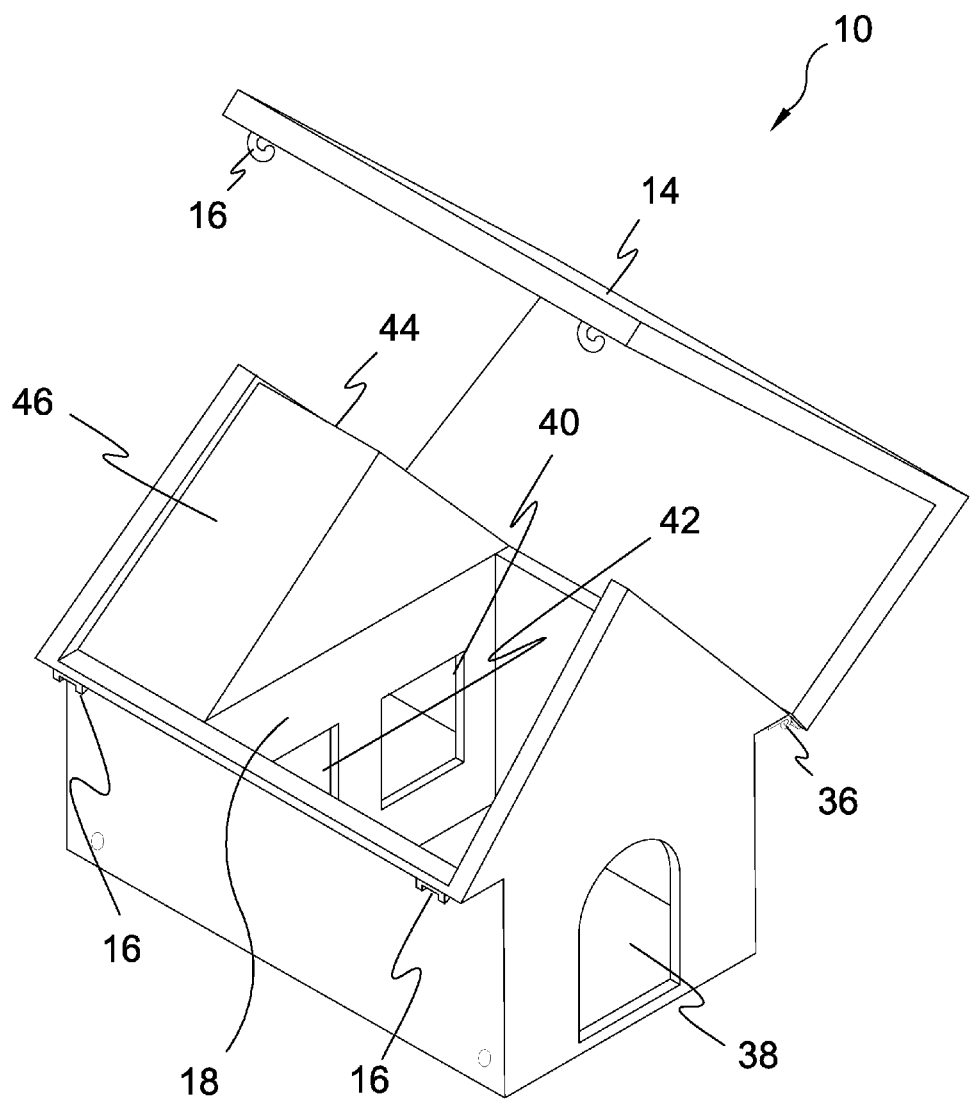
Figure 4:
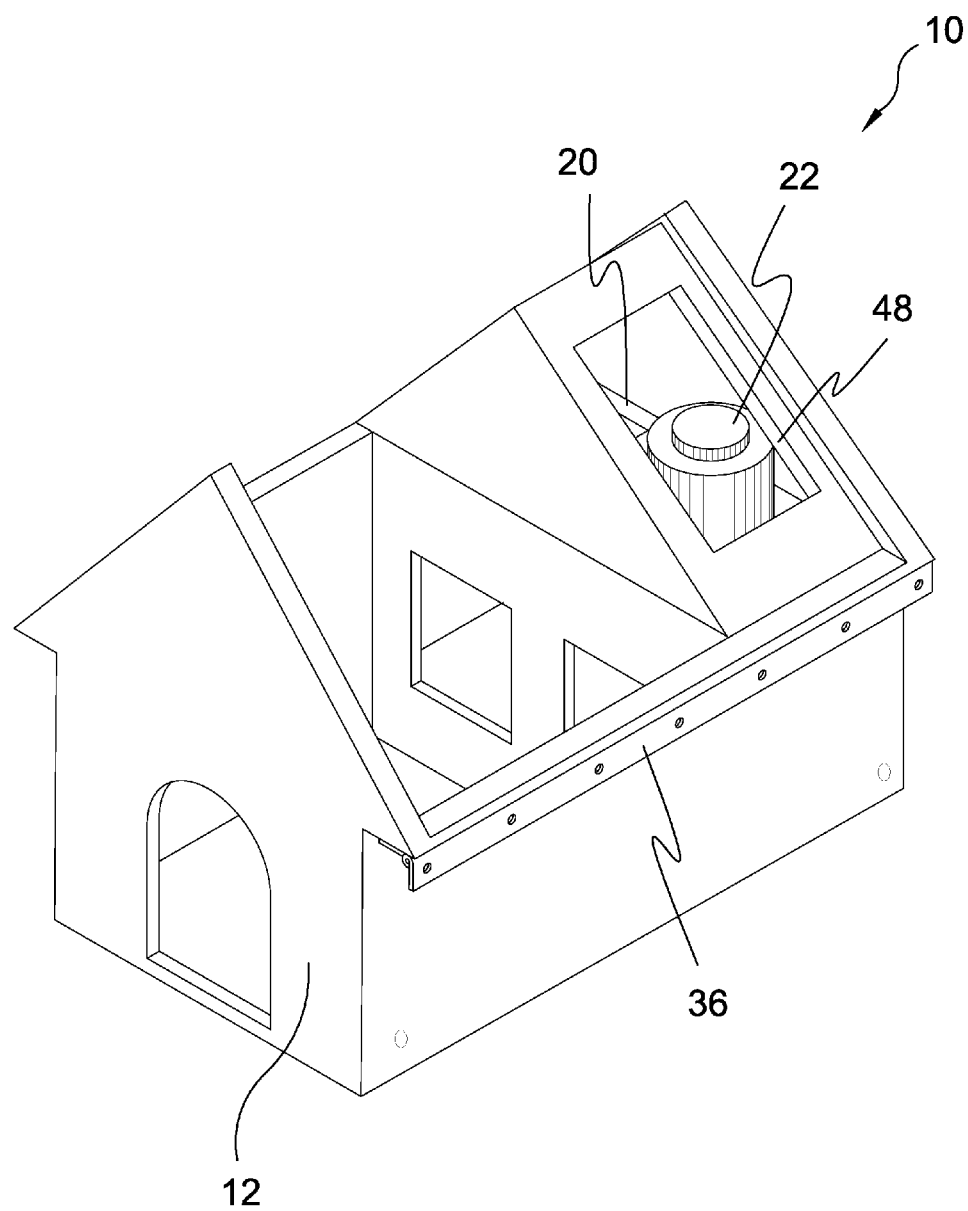
Figure 5:
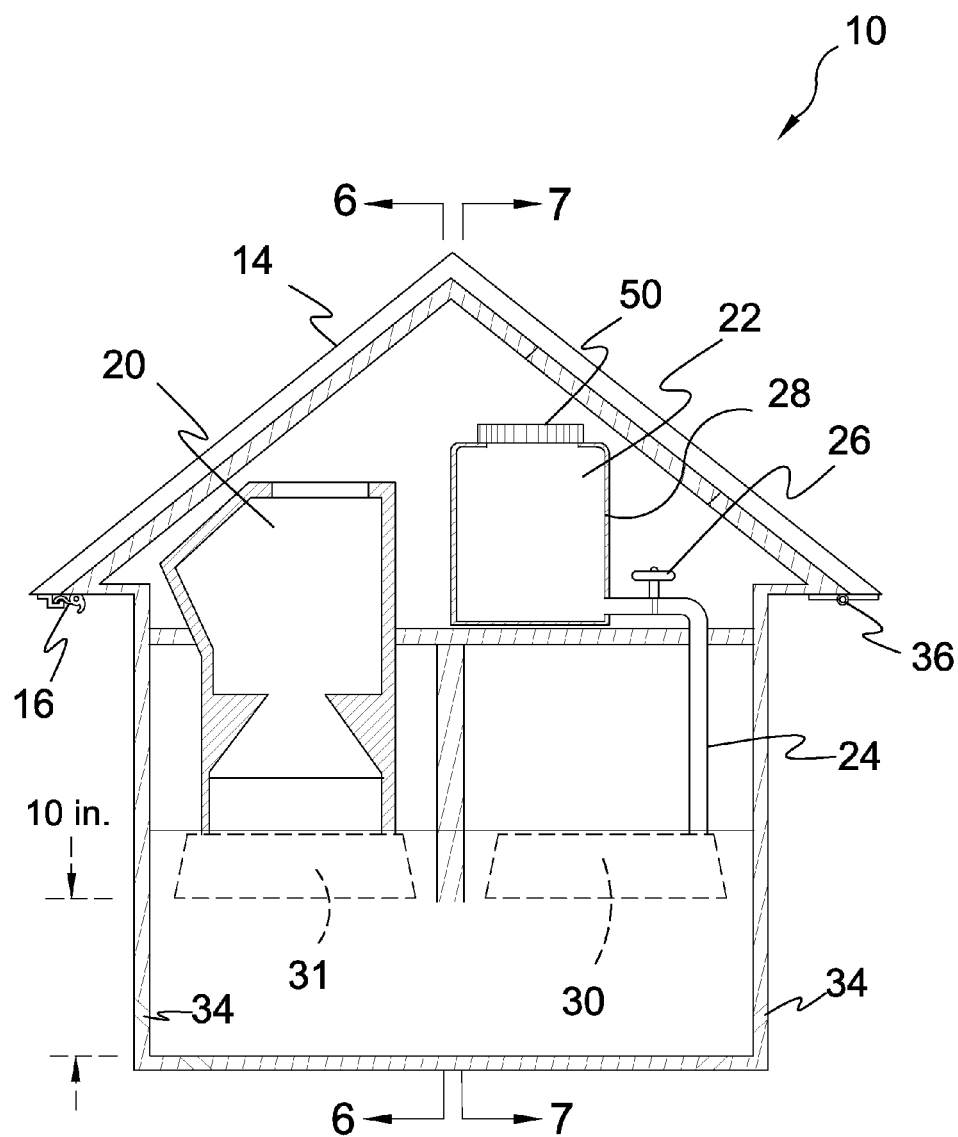
Figure 6:
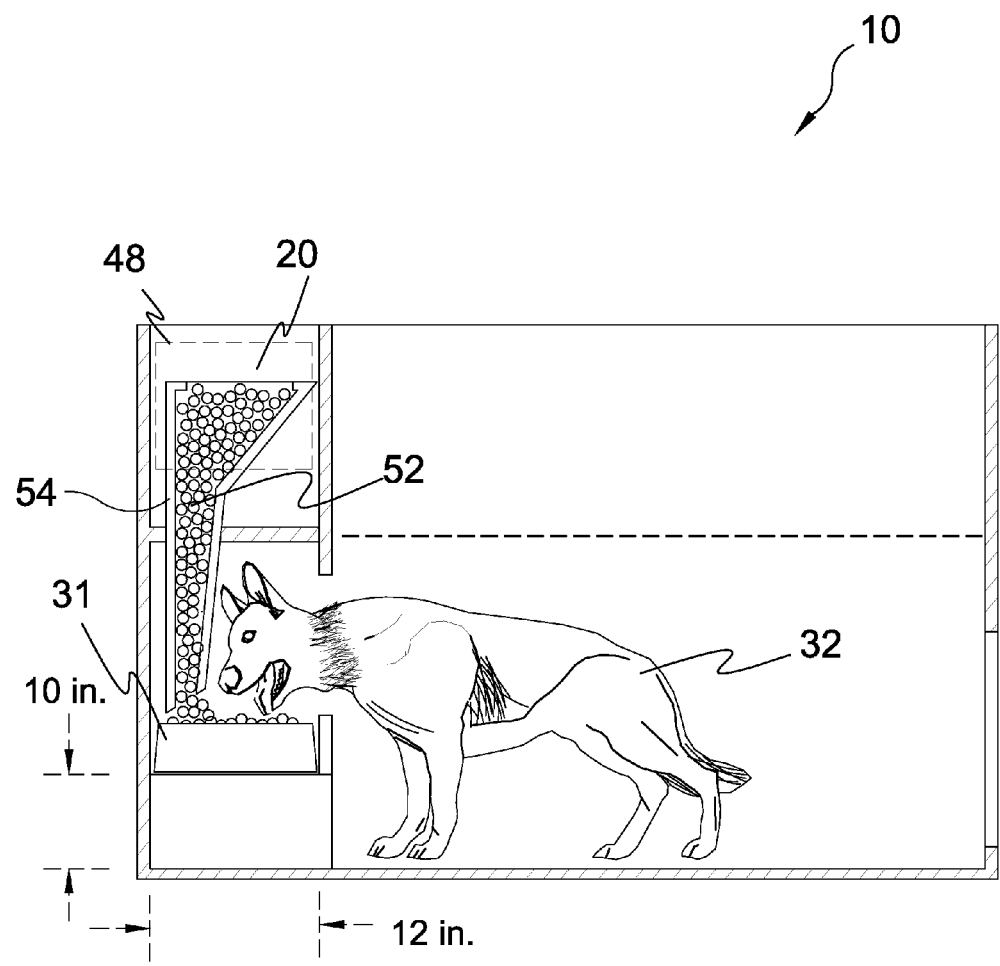
Figure 7:
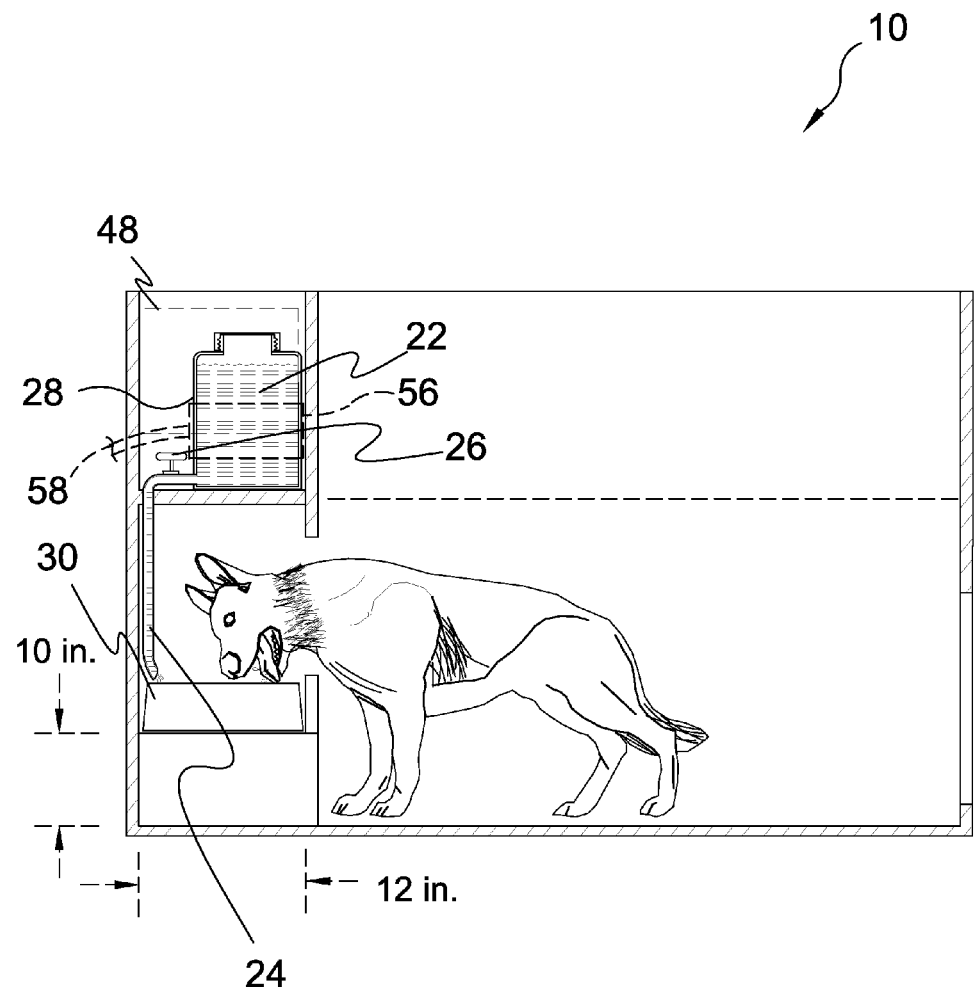
Figure 8:
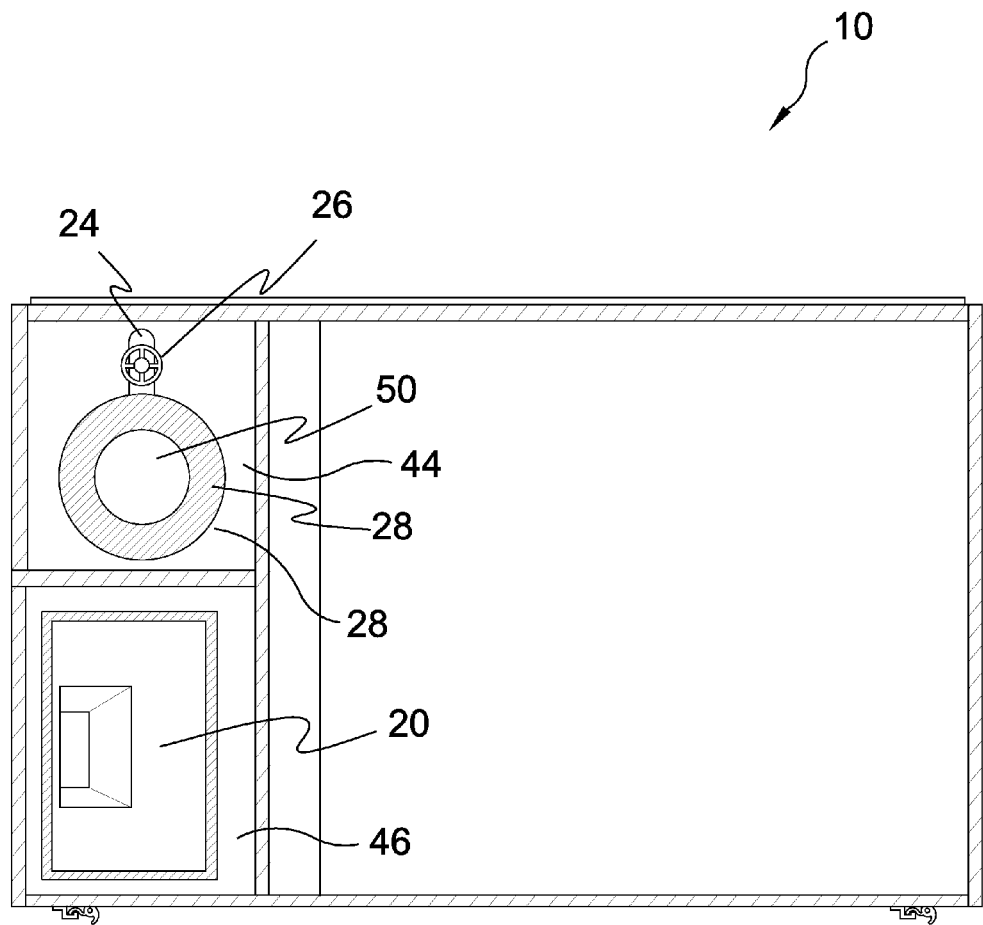

In order that the invention may be more fully understood, it will now be described, by way of example, with reference to the accompanying drawing in which:

FIG. 1 is an illustrative view of the present invention in use.
FIG. 2 is a perspective view of the present invention.
FIG. 3 is a perspective view of the present invention.
FIG. 4 is a perspective view of the present invention.
FIG. 5 is a sectional view of the present invention.
FIG. 6 is a side sectional view of the present invention.
FIG. 7 is a side sectional view of the present invention.
FIG. 8 is a top sectional view of the present invention.

DESCRIPTION OF THE REFERENCED NUMERALS

Turning now descriptively to the drawings, in which similar reference characters denote similar elements throughout the several views, the figures illustrate the Pet Shelter Having Automatic Feeding and Watering Stations of the present invention. With regard to the reference numerals used, the following numbering is used throughout the various drawing figures.

- 10 Pet Shelter Having Automatic Feeding and Watering Stations of the present invention
- 12 main shelter housing
- 14 hinged roof
- 16 latch member
- 18 interior wall
- 20 automatic food dispenser
- 22 automatic water dispenser
- 24 water flow tubing
- 26 on/off valve
- 28 water storage reservoir
- 30 water dish
- 31 food dish
- 32 pet
- 34 anchor aperture
- 36 hinge
- 38 pet entrance
- 40 interior water access recess
- 42 interior food access recess
- 44 water supply compartment
- 46 food supply compartment
- 48 upper access opening
- 50 threaded cap
- 52 pet food
- 54 hopper
- 56 heating element
- 58 power cord of 56

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention in use. The present invention is a pet shelter with automatic feeding and watering stations 10 that are preferably 10 inches from the floor and 12 inches deep with a roof 14 hingedly attached to the main housing 12 and secured in a closed position on one side of the housing by latches 16. When said latches 16 are disconnected, the roof 14 can be swung open for easy access to the interior. Within the back interior wall 18 of the pet shelter are two side by side compartments. One side provides an automatic food dispenser 20 that fills as the pet eats and the other side has an automatic water dispenser 22. Both compartments are accessed through an opening on the water compartment side. The water dispenser 22 has tubing 24 with an on/off valve 26 that runs from the water storage reservoir 28 down into the water dish 30. The valve 26 is shut off when the water dish 30 is refilled. The remaining portion of the interior structure is housing for the pet 32. A plurality of apertures 34 are disposed around the base of the housing 12 for receiving anchors to secure the shelter to the ground.

FIG. 2 is a perspective view of the present invention. Shown is the exterior of the pet shelter with automatic feeding and watering stations 10 with a roof 14 attached to the main housing 12 by hinges 36 and secured in a closed position on the other side of the housing 12 by latches 16. When said latches 16 are disconnected, the roof 14 can be swung open for easy access to the interior. Also shown are base approximate apertures 34 for inserting anchors to prevent displacement of the pet shelter by the pet or weather conditions.

FIG. 3 is a perspective view of the present invention. Shown is the pet shelter with automatic feeding and watering stations 10 with the roof 14 in an open position being attached to the main housing 12 with hinges 36 and secured in a closed position on one side of the housing by mating latch members 16. When said latches 16 are disconnected, the roof can be swung open for easy access to the interior. The housing 12 includes an entrance 38 and an interior back wall 18 with an interior water compartment access recess 40 leading to the water supply compartment 44 and an interior feeding access recess 42 leading into the food supply compartment 46.

FIG. 4 is a perspective view of the present invention. Shown is the pet shelter with automatic feeding and watering stations 10 with roof removed from the hinge 36 for clarity from the main housing 12. There is an upper access opening 48 to provide access to fill the food dispenser 20 and the water dispenser 22.

FIG. 5 is a sectional view of the present invention. Shown is the pet shelter with automatic feeding and watering stations 10 that are preferably 10 inches from the floor and 12 inches wide having a roof 14 hingedly 36 attached to the main housing 12 and secured in a closed position on one side of the housing by latches 16. Provided is an automatic food dispenser 20 that fills a food dish 31 through a hopper as the pet eats. An automatic water dispenser 22 comprising a water storage reservoir 28 and threaded cap 50 with water flow tubing 24 leading to the water dish 30. The tubing 24 has an automatic on/off valve 26 that regulates gravity feeding of water from the reservoir 28 to the water dish 30. Anchor apertures 34 enable the user to anchor the shelter to the ground.

FIG. 6 is a side sectional view of the present invention. Shown is the pet shelter with automatic feeding and watering stations 10 illustrating the food dispenser 20 wherein pet food 52 is introduced through the upper access opening 48 into the hopper 54 and delivered to the food dish 31 for the pet 32 to eat.

FIG. 7 is a side sectional view of the present invention. Shown is the pet shelter with automatic feeding and watering stations 10 that are preferably 10 inches from the floor and 12 inches deep with the water station having an automatic water dispenser 22 accessed through an upper access opening 48. The water dispenser 22 has tubing 24 with an on/off valve 26. The tubing 24 runs from the water storage reservoir 28, down into the water dish 30. The valve 26 is shut off when the water dish 30 is refilled. An optional heating element 56 and power cord 58 may be employed to prevent the water from freezing during cold weather.

FIG. 8 is a top sectional view of the present invention. Shown is a top view, looking into the pet shelter with automatic feeding and watering stations 10. On the back interior wall of the pet shelter are two compartments, side by side. Depicted are the food supply compartment 46 with automatic food dispenser 20 and the water supply compartment 44 with automatic water dispenser 22 comprising a reservoir 28 with a threaded cap 50, water flow tubing 24 and an on/off water valve 26.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A pet shelter having automatic feeding and watering stations comprising:
   a) a main shelter housing having a front wall with a pet entrance, side and rear outer walls, and a rear interior wall spaced from said rear outer wall;
   b) a pair of compartments disposed between said rear interior wall and said rear outer wall defining a food supply compartment and a water supply compartment;
   c) an automatic food dispenser disposed within said food supply compartment;
   d) a water dispenser disposed within said water supply compartment;
   e) separate openings in said rear interior wall providing access to said food and water supply compartments for said pet to eat said food and drink said water within said compartments;
   f) a food dish on a raised platform within said food supply compartment;
   g) a water dish on a raised platform within said water supply compartment;
   h) a hinged, peaked outer roof capable of swinging open to provide access to said food supply compartment and said water supply compartment;
   i) an inner peaked roof covering said food and water supply compartments;
   j) a side of said inner peaked roof over said water supply compartment having an opening for access to said water and food supply compartments; and
   k) said water dispenser comprising a container of water on a shelf above said water dish in said water supply compartment, said container having a threaded cap for refilling said container directly below to said opening in said inner peaked roof, tubing from said container of water to said water dish for resupplying said water drinking dish, and an on/off valve on said shelf adjacent said container and also directly underneath said opening in said inner peaked roof.

2. The pet shelter having automatic feeding and watering stations according to claim 1, wherein said automatic food dispenser comprises a hopper leading to said food dish.

3. The pet shelter having automatic feeding and watering stations according to claim 2, wherein food in said hopper provides a supply of said food to said food dish therefrom.

4. The pet shelter having automatic feeding and watering stations according to claim 3, wherein food in said food dish is subject to replenishment from the hopper as the food level in said food dish decreases.

5. The pet shelter having automatic feeding and watering stations according to claim 4, wherein said on/off valve is automatic that regulates gravity feed of water from said container to said water dish to maintain a constant level of water in said water dish.

6. The pet shelter having automatic feeding and watering stations according to claim 5, wherein said outer peaked roof is pivotally fastened to said shelter housing on a side of said shelter by at least one hinge.

7. The pet shelter having automatic feeding and watering stations according to claim 6, wherein said roof is releasably secured to a other side of said shelter housing with mating latch members.

8. The pet shelter having automatic feeding and watering stations according to claim 7, wherein said food dish and said water dish are elevated approximately ten inches above a floor within said shelter.

9. The pet shelter having automatic feeding and watering stations according to claim 8, wherein the platforms supporting said food dish and said water dish are each approximately twelve inches wide by twelve inches in length.

10. The pet shelter having automatic feeding and watering stations according to claim 9, wherein said shelter housing further comprises a plurality of anchor apertures disposed around a base portion thereof for anchoring said housing to the ground.

11. The pet shelter having automatic feeding and watering stations according to claim 10, wherein said water dispenser further comprises a heating element to prevent the water therein from freezing.

\* \* \* \* \*